(12) United States Patent  
Lo (10) Patent No.: US 7,181,246 B2  
(45) Date of Patent: Feb. 20, 2007

(54) ADAPTIVE COMMUNICATIONS SYSTEM AND METHOD

(75) Inventor: Titus Lo, Redmond, WA (US)

(73) Assignee: Neocific, Inc., Bellevue, WA (US)

( * ) Notice: Subject to any disclaimer, the term of this patent is extended or adjusted under 35 U.S.C. 154(b) by 606 days.

(21) Appl. No.: 10/456,654

(22) Filed: Jun. 5, 2003

(65) Prior Publication Data

US 2004/0014431 A1    Jan. 22, 2004

Related U.S. Application Data

(60) Provisional application No. 60/386,347, filed on Jun. 5, 2002.

(51) Int. Cl.
*H04M 1/00* (2006.01)

(52) U.S. Cl. .............. 455/562.1; 455/101; 455/103; 455/63.1; 455/67.13; 455/65; 375/299; 375/347; 375/267; 375/295; 370/252; 370/334

(58) Field of Classification Search ............... 455/101, 455/103, 63.1, 67.13, 562.1, 273, 65; 375/299, 375/347, 267, 295; 370/334, 252
See application file for complete search history.

(56) References Cited

U.S. PATENT DOCUMENTS

| | | | |
|---|---|---|---|
| 5,933,421 A | | 8/1999 | Alamouti et al. |
| 6,115,427 A | * | 9/2000 | Calderbank et al. ......... 375/267 |
| 6,185,258 B1 | | 2/2001 | Alamouti et al. |
| 6,212,242 B1 | * | 4/2001 | Smith et al. ................. 375/299 |
| 6,314,147 B1 | * | 11/2001 | Liang et al. ................. 375/346 |
| 6,327,310 B1 | * | 12/2001 | Hochwald et al. .......... 375/259 |
| 6,351,499 B1 | * | 2/2002 | Paulraj et al. ............... 375/267 |
| 6,430,231 B1 | * | 8/2002 | Calderbank et al. ........ 375/295 |
| 6,510,173 B1 | * | 1/2003 | Garmonov et al. ......... 375/141 |
| 6,560,295 B1 | * | 5/2003 | Hammons et al. .......... 375/299 |
| 6,754,286 B2 | * | 6/2004 | Hottinen et al. ............ 375/299 |
| 6,804,307 B1 | * | 10/2004 | Popovic ...................... 375/299 |
| 6,853,689 B1 | * | 2/2005 | Nilsson ....................... 375/267 |
| 6,898,248 B1 | * | 5/2005 | Elgamal et al. ............. 375/259 |
| 6,985,434 B2 | * | 1/2006 | Wu et al. .................... 370/208 |

OTHER PUBLICATIONS

3GPP Organization Partners, "Technical Specification Group Radio Access Network; TX Diversity Solution for Multiple Antennas (Release 5)", 3GPP TR25.869 v1.0.0 (Jun. 2001), 2000, (available at http://www.3gpp.org).

A. Narula, M. J. Lopez, M. D. Trott, and G. W. Wornell, "Efficient Use of Side Information in Multiple-Antenna Data Transmission over Fading Channels", IEEE Journal on Selected Areas in Communications, Oct. 1998, pp. 1423-1436, vol. 16, No. 8.

(Continued)

*Primary Examiner*—Marceau Milord
(74) *Attorney, Agent, or Firm*—Perkins Coie LLP (57) ABSTRACT

An arrangement where a transmitter has multiple transmitting antennas that simultaneously transmit, and where the signals delivered to each transmitting antenna is processed by a space-time transmitter based on the side information that is related to the channel coefficients found between the transmitting antennas and multiple receiving antennas. The receiver's receiving antennas simultaneously receive the transmitted signals, and the signal from each receiving antenna is processed by the space-time receiver to extract the information symbols that have been transmitted. Alternative systems are possible, such as those employing frequency or code diversity, as well as those employing only one transmit antenna and multiple receive antennas (or visa versa).

44 Claims, 3 Drawing Sheets

OTHER PUBLICATIONS

A. Wittneben, "Base Station Modulation Diversity for Digital Simulcast", IEEE Vehicular Technology Conference (VTC) Program, May 19-22, 1991, pp. 848-853, St. Louis, Missouri.

J. B. Anderson, "Array Gain and Capacity for Known Random Channels with Multiple Element Arrays at Both Ends," IEEE Journal on Selected Areas in Communications, Nov. 2000, pp. 2172-2178, vol. 18, No. 11.

J. Hamalainen and R. Wichman, "Closed-Loop Transmit Diversity for FDD WCDMA Systems", Conference Record of the Thirty-Fourth Asilomar Conference on Signals, Systems and Computers, 2000 pp. 111-115, vol. 1.

N. Seshadri and J. Winters, "Two Signaling Schemes for Improving the Error Performance of FDD Transmission Systems Using Transmit Antenna Diversity", IEEE Vehicular Technology Conference (VTC) Program, May 1993, pp. 508-511.

Q. T. Zhang, "Probability of Error for Equal-Gain Combiners over Rayleigh Channels: Some Closed-Form Solutions", IEEE Transactions on Communications, Mar. 1997, pp. 270-273, vol. 45, No.3.

S. Alamouti, "A Simple Transit Diversity Technique for Wireless Communications", IEEE Journal on Select Areas in Communications, Oct. 1998, pp. 1451-1458, vol. 16.

T. Lo, "Maximum Ratio Transmission", IEEE Transactions on Communications, Oct. 1999, pp. 1458-1461, No. 10, vol. 47.

V. Tarokh, N. Seshadri, and A. R. Calderbank, "Space-time Codes for High Data Rate Wireless Communication: Performance Criteria and Cod Construction, "IEEE Transaction on Information Theory, Mar. 1998, pp. 744-765. vol. 44.

W. C. Jakes, Jr., "Microwave Mobile Communication", 1974, John Wiley & Sons, New York.

* cited by examiner

FIGURE 1A

FDD system

TDD system

Figure 4 Example of quantization of phase.

ADAPTIVE COMMUNICATIONS SYSTEM AND METHOD

CROSS-REFERENCE TO RELATED APPLICATION(S)

This application claims the benefit of U.S. Provisional Patent Application No. 60/386,347, filed Jun. 5, 2002. This provisional application, together with Disclosure Document No. 496342, entitled "Adaptive Space-Time Transmission," and received by the Office of Initial Patent Examination on Jul. 2, 2001, are incorporated herein by reference.

BACKGROUND

Wireless communications services, whatever forms they are in, are provided through radio links, where information such as voice and data is transmitted via modulated electromagnetic waves. Regardless of their forms, all wireless communications systems suffer from adverse propagation effects namely, multipath fading. It is usually caused by the destructive superposition of multipath signals reflected from various types of objects in the propagation environments, creates errors in wireless transmission. One of the common methods used to combat multipath fading is the antenna diversity technique, where two or more antennas at the receiver and/or transmitter are so separated in space or polarization that their fading envelopes are sufficiently decorrelated. A classical combining technique is the maximum-ratio combining (MRC) where the signals from the received antenna elements are weighted such that the signal-to-noise ratio (SNR) of their sum is maximized. However, the MRC technique has so far been used exclusively for receiving applications.

As there are more and more emerging wireless services, many applications require diversity at the transmitter or at both transmitter and receiver. As a result, various transmit diversity techniques have been proposed. For example, a delay transmit diversity scheme was proposed, where the replicas of the signal are transmitted through multiple antennas at different times, thereby minimizing the correlation of the fading envelope at the receiver. Another approach to transmit diversity was to encode the information symbols with forward error correction codes in both space (i.e., antennas displacement) and in time. Another transmit diversity scheme, commonly referred to as space-time block coding (STBC), also makes use of space and time transmission, where a pair of symbols is transmitted using two antennas at first and the transformed version of the pair is transmitted to obtain the MRC-like diversity. However, these transmit diversity techniques are open-loop systems, where it is assumed that there was no information regarding the propagation channel (commonly referred to as "side information") available at the transmitter.

Side information is, however, available to the transmitter in many systems, such as a time division duplex (TDD) system or a system with feedback. When it is available, side information is proven useful. In fact, closed-loop systems have been proposed to incorporate the side information to improve performance. For example, side information was used in determining the transmission weights for a transmit beamformer to a receiver with a single antenna. Another proposed approach employs the maximum ratio transmission (MRT) technique as a generalization of the maximum ratio algorithm for multiple transmitting antennas and multiple receiving antennas where perfect knowledge of the channel states is assumed. The use of side information was also proposed for carrying out eigen-beamforming at the base transmitter in 3GPP WCDMA. All these schemes assumed the availability of accurate side information of the individual transmission paths or the coefficients of the channel matrix. For a feedback system, this requires a considerable amount of feedback bandwidth. For a system with K transmit antennas and L receive antennas, K×L complex channel coefficients (i.e., 2 K×L scalar values) have to be fed back from the receiver to the transmitter.

SUMMARY

Embodiments of the invention employ an adaptive space-time transmit diversity system using side information. It is a simple but effective transmission method for combating multipath fading using multiple antennas both at the transmitter and receiver, as well as side information. It is efficient in terms of feedback-bandwidth requirements for side information in that the side information to feedback is a scalar value instead of values of a complex channel matrix. In addition, it allows the transmitter to accommodate, without requiring additional signaling protocol, receivers with arbitrary numbers of antennas. The space-time signal set to be transmitted is generated adaptively based on the availability and quality of the side information so that additional gain in SNR can be achieved at the receiver. As explained below, in the case of two transmitting antennas and multiple receiving antennas, the resulting gain at the receiver is $$G_{AST} = \frac{1}{2\sigma_h^2} \sum_{l=1}^{L} (|h_{1l}|^2 + |h_{2l}|^2) + \frac{(1-\lambda)^{1/2}}{\sigma_h^2} \text{Re}\left( v^* \sum_{l=1}^{L} h_{1l} h_{2l}^* \right)$$

The methods are presented in the context of space and time, but can also be applied to systems that use other diversity techniques, such as space and frequency or space and coding. While systems generally described in detail below employ multiple transmit and receive antennas, alternative systems may employ only one transmit antenna and multiple receive antennas, or visa versa.

BRIEF DESCRIPTION OF THE DRAWINGS

FIG. 1A is an example of a wireless system with a space-time transmitter, multiple transmitting antennas, multiple receiving antennas and a space-time receiver under a frequency division duplex (FDD) system, while

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

Figure 1A:
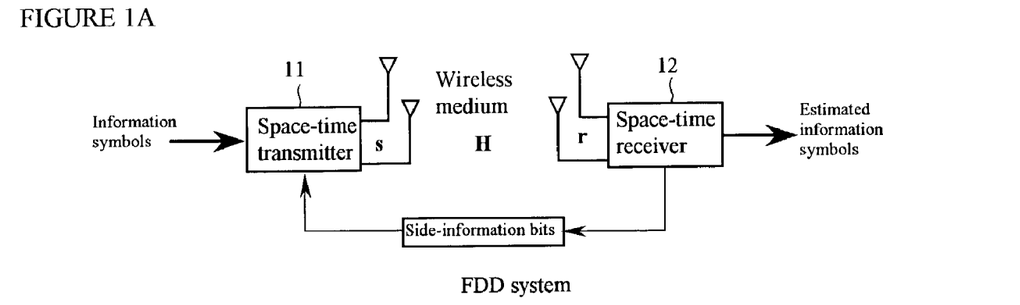
Figure 1B:
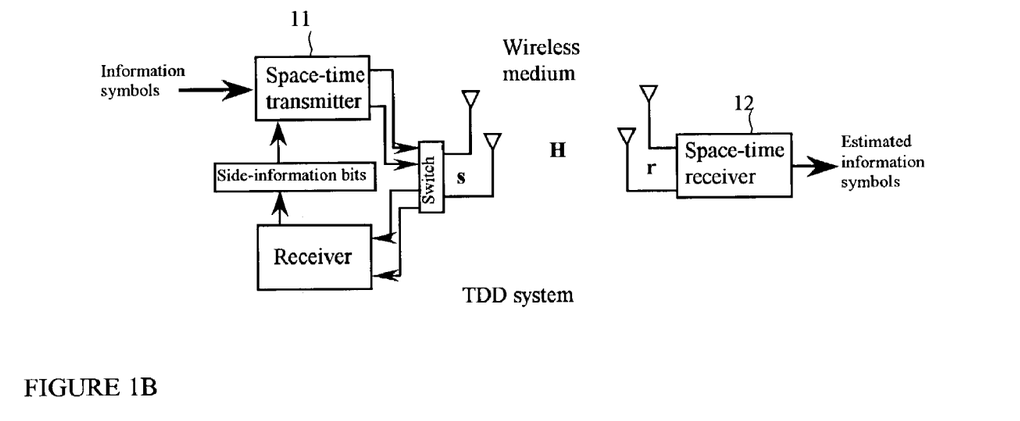
FIG. 1B is an alternative example under a TDD system.

FIGS. 1A and 1B (collectively, "FIG. 1") show an adaptive space-time transmit system having multiple antennas at both the transmitter and receiver. Unless described otherwise below, aspects of the invention may be practiced with conventional systems. Thus, the construction and operation of the various blocks shown in FIG. 1 may be of conventional design, and need not be described in further detail herein to make and use the invention, because such blocks will be understood by those skilled in the relevant art. One skilled in the relevant art can readily make any modifications necessary to the blocks in this and other Figures (or other embodiments) based on the detailed description provided herein.

Incoming information symbols are transformed into space-time signals by a space-time transmitter 11, which are then transmitted using two antennas across two transmit times (although more than two antennas may be employed). The two transmitted signals can be represented by a 2×2 matrix, $$s = \begin{bmatrix} s_{11} & s_{12} \\ s_{21} & s_{22} \end{bmatrix} \quad (1)$$

where the entry $s_{km}$ denotes the signal to be transmitted via antenna k at time m. The transmitted signals are received, via a wireless channel, by L receiving antennas at a space-time receiver 12. The received signals are then processed by the space-time receiver 21 to extract the information symbols. The wireless channel consists of 2×L coefficients, which can conveniently be represented by a matrix, $$H = \begin{bmatrix} h_{11} & \cdots & h_{1L} \\ h_{21} & \cdots & h_{2L} \end{bmatrix} \quad (2)$$

where a given entry in the matrix is a complex value with a amplitude and phase (i.e., $h_{kl}=a_{kl}e^{j\Phi_{kl}}$) and denotes a channel coefficient for the path from antenna k to antenna/with an average power defined as the expectation of the square of its absolute value (i.e., $\sigma_h^2=E[|h_{kl}|^2]$). The channel is assumed to be quasi-static; that is, it remains the same within the two transmission times. The channel may be modeled as multiplicative distortion with respect to the transmitted signals. Thus, the received signals can be represented by an L×2 matrix, $$r = H^T s + \mathcal{N} = \begin{bmatrix} r_{11} & r_{12} \\ \vdots & \vdots \\ r_{L1} & r_{L2} \end{bmatrix} \quad (3)$$

where a given entry $r_{lm}$ in the matrix above denotes the received signal via antenna l at time m and N is an L×2 matrix whose entry denotes the spatially independent white Gaussian noise associated with $r_{lm}$; that is, $$\mathcal{N} = \begin{bmatrix} n_{11} & n_{12} \\ \vdots & \vdots \\ n_{L1} & n_{L2} \end{bmatrix} \quad (4)$$

where $n_{lm}$ has a zero mean and a variance of $\sigma_n^2$ for l=1, . . . , L and m=1,2.

Figure 2:
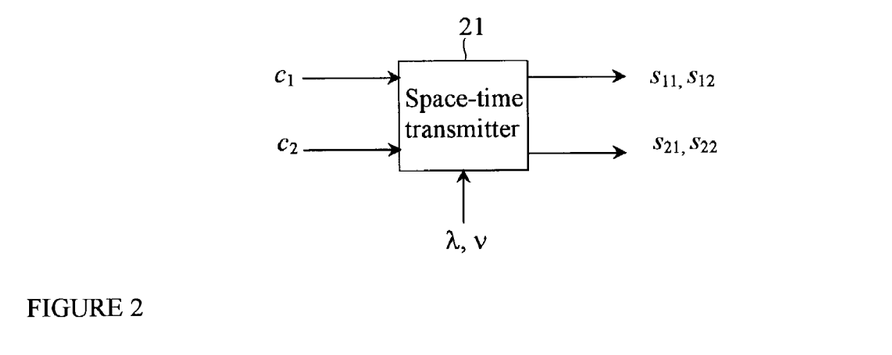
FIG. 2 is a block diagram of the space-time transmitter of FIG. 1.

The signals to be transmitted are produced by the space-time transmitter 21 in FIG. 2 with the following format. At time instant $t_1$, a pair of signals, which is a weighted combination of the two symbols, $c_1$ and $c_2$, are transmitted simultaneously via the two antennas, $$s_{11} = \frac{c_1}{\sqrt{2}} \quad (5)$$

and $$s_{21} = \frac{1}{\sqrt{2}}[\nu(1-\lambda)^{1/2}c_1 + \lambda^{1/2}c_2] \quad (6)$$

where v is the weighting coefficient based on the side information delivered from the receiver and the parameter $\lambda$ ($0 \leq \lambda \leq 1$) is a distribution coefficient. At $t_2$, another pair of signals, which is a related version of the previous one, is transmitted simultaneously via the two antennas, $$s_{12} = \frac{c_2^*}{\sqrt{2}} \quad (7)$$

and $$s_{22} = \frac{1}{\sqrt{2}}[-\nu(1-\lambda)^{1/2}c_2^* + \lambda^{1/2}c_1^*] \quad (8)$$

(The symbol "*" represents the complex conjugate of a value.) In this specific structure, the weighting coefficient v in $s_{21}$ and $s_{22}$ is applied so that the paired transmitted signals ($s_{11}$ and $S_{21}$, or $s_{12}$ and $s_{22}$) will be properly aligned in phase when they reach the receiver. The condition $|\nu|^2=1$ is employed for two reasons. The first is a practical hardware consideration. Under this condition, the variation of the envelopes of both signals can be kept the same (i.e., equal transmit gain). In the case of phase-shift keying (PSK) modulation, which is commonly used in many communications systems, the constant signal envelope allows the use of low-cost power amplifiers with less linearity requirement and hence less power consumption in transmission. The second is a system consideration. By setting $|\nu|^2=1$, the transmitter needs only the knowledge of the phase value of v. Consequently, the feedback requirement is reduced from 2L complex values to a single real value. In addition, it allows the transmitter to accommodate, without requiring additional signaling protocol, a receiver with an arbitrary number of antennas. The distribution coefficient $\lambda$ allocates energy between symbols $c_1$ and $c_2$ to be transmitted, in accordance with the quality of the side information. As explained in more detail below, such a configuration provides for adaptive space-time transmission to provide for increased gain at the receiver.

Figure 3:
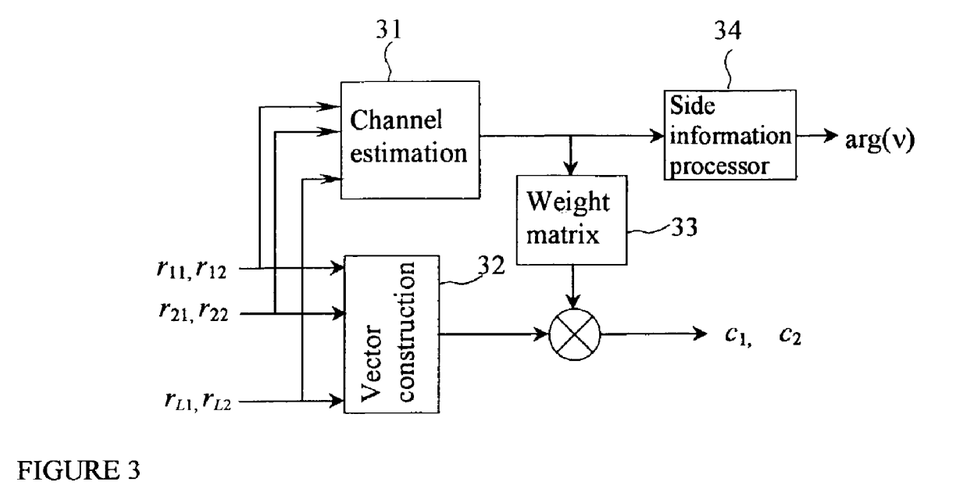
FIG. 3 is a block diagram of the space-time receiver of FIG. 1.

Referring to FIG. 3, an example of the receiver 12 as shown as having a channel estimation block 31 and a vector construction block 32, each of which receives the incoming signals $r_{11}$, $r_{12}$ through $r_{11}$, $r_{12}$. As explained in greater detail below, the output of the channel estimation block 31 is input to a weight matrix block 33, whose output is multiplied with an output of the vector construction block 32 to reproduce symbols $c_1$ and $c_2$. Furthermore, as described below, a side information processor 34 receives output from the channel estimation block 31 and provides a feedback signal to the transmitter (via a frequency different from the reception frequency under the FDD system of FIG. 1A, or at different times from under the reception times under TDD system of FIG. 1B). To estimate the transmitted symbols at the receiver 12, a received signal vector is constructed from the received signals described in equation (3) using the vector constructor 32 as $$r' = [r_{11}\ r_{12}^*\ r_{21}\ r_{22}^*\ \ldots\ r_{L1}\ r_{L2}^*]^T \tag{9}$$

Furthermore, a weight matrix is constructed using the weight matrix constructor 33, based on the channel information from the channel estimator 31, as follows, $$W = [W_1\ \ldots\ W_L] \tag{10}$$

which consists of L sub-matrices, defined as $$W_l = \begin{bmatrix} A_l^* & B_l \\ B_l^* & -A_l \end{bmatrix} \tag{11}$$

The entries of $W_l$ are related by the channel coefficients, as given by $$A_l = h_{1l} + h_{2l} v(1-\lambda)^{1/2} \tag{12}$$

and $$B_l = h_{2l} \lambda^{1/2} \tag{13}$$

The estimates of the symbols are determined by simply multiplying W by r', namely, $$\begin{bmatrix} \tilde{c}_1 \\ \tilde{c}_2 \end{bmatrix} = W \times r' = \sqrt{2}\, G \begin{bmatrix} c_1 \\ c_2 \end{bmatrix} + \eta \tag{14}$$

where $$G = \frac{1}{2} \sum_{l=1}^{L} (|A_l|^2 + |B_l|^2) \tag{15}$$

The effective noise vector $\eta$ consists of two elements; that is, $$\eta = W[n_{11}\ n_{12}^*\ n_{21}\ n_{22}^*\ \ldots\ n_{L1}\ n_{L2}^*]^T = [\eta_1\ \eta_2]^T \tag{16}$$

It can be shown that the variance of $\eta_1$ and $\eta_2$ can be expressed as $$\sigma_\eta^2 = 2G\sigma_n^2 \tag{17}$$

It follows that the SNR for $\tilde{c}_1$ and $\tilde{c}_2$ is given by $$\gamma = \gamma_0 \frac{G}{\sigma_h^2} = \gamma_0 G_{AST} \tag{18}$$

where $$\gamma_0 = \frac{\sigma_c^2 \sigma_h^2}{\sigma_n^2}$$

denotes the average SNR measured at a receiver for the case of a single transmit antenna and a single receive antenna (i.e., without diversity) and the normalized gain $G_{AST}$ is given by expanding (15), $$G_{AST} = \underbrace{\frac{1}{2\sigma_h^2} \sum_{l=1}^{L} (|h_{1l}|^2 + |h_{2l}|^2)}_{G_{min}} + \underbrace{\frac{(1-\lambda)^{1/2}}{\sigma_h^2} \mathrm{Re}\left( v^* \sum_{l=1}^{L} h_{1l} h_{2l}^* \right)}_{G_x} \tag{19}$$

$G_{AST}$ can be viewed as a gain consisting of two components: minimum gain $G_{min}$ that is achievable without side information feedback, and extra (additional) gain $G_x$ using side information. By expressing $$\sum_{l=1}^{L} h_{1l} h_{2l}^* = R e^{j\Phi}$$

(i.e., a quantity have a magnitude and phase), and recalling the condition $|v|^2 = 1$, the extra gain can be expressed in the form of $$G_x = \frac{(1-\lambda)^{1/2}}{\sigma_h^2} R \cos[\Phi - \arg(v)] \tag{20}$$

$$= \frac{(1-\lambda)^{1/2}}{\sigma_h^2} R \cos\varepsilon$$

where $\varepsilon$ represents the discrepancy between the current channel state $\Phi$ and the side information $\arg(v)$, produced by the side information processor 34, explained below.

Details on implementing the system follow. Eq. (20) indicates that the magnitude of the extra gain depends on both how accurately the side information, $\arg(v)$, represents the current state, which then determines how the distribution coefficient, $\lambda$, is set. Recall that $\lambda$ was introduced in the first place for adapting to the quality of the side information. Therefore, it is intrinsically a function of $\varepsilon$. In order to realize a reasonable level of $G_x$, the value of $\lambda$ has to be set in accordance to the characteristics of $\varepsilon$. Various cases for maximizing the gain will now be discussed.

Consider first the case of perfect side information received at the transmitter. If the side information truly represents the current state (i.e., $\arg(v) = \Phi$), $G_x$ is maximized by setting $\lambda = 0$, thereby resulting in the extra gain, $G_x = R$. In this case, this scheme is equivalent to traditional beamforming because at each transmission, the signal set consists of the elements of a symbol multiplied by the weights. Its gain becomes, $$G_{AST} = \frac{1}{2\sigma_h^2} \sum_{l=1}^{L} (|h_{1l}|^2 + |h_{2l}|^2) + \frac{1}{\sigma_h^2} \left| \sum_{l=1}^{L} h_{1l} h_{2l}^* \right| \quad (21)$$

In the case of L=1, it is interesting to see that the instantaneous SNR, $$\gamma = \frac{\gamma_0}{\sigma_h^2} \left[ \frac{1}{2} (|h_{1l}|^2 + |h_2|^2) + |h_1 h_2^*| \right] \quad (22)$$

is exactly the same as in the case of two-branch equal-gain combining (EGC).

Consider now the case of no side information received at the transmitter. If there is no side information available at the transmitter, the sinusoidal term in $G_x$ can take on any value from −1 to 1 with an equal probability. Since the negative values have adverse impacts on the SNR, one should set λ=1 so that $G_x$=0 to totally eliminate the negative impact. Thus, $G_{AST}=G_{min}$. This corresponds to the case of the STBC. In sum, the space-time signal set to be transmitted is generated adaptively based on the availability and quality of the side information so that additional gain in SNR can be achieved at the receiver where possible, but where the corresponding negative impact is eliminated.

Consider now a third case with quantized side information. In order to feed back the side information from the receiver to the transmitter, the side information may be quantized. If the quantized version of arg(v) is denoted by Ψ, then $$\Psi = arg(v) + \epsilon_q \quad (23)$$

where $\epsilon_q$ denotes the quantization error. In the case of no other errors (i.e., arg(v)=Φ), by setting λ=0 the extra gain becomes $$G_x = \frac{1}{\sigma_h^2} R\cos[\Phi - \Psi] = \frac{1}{\sigma_h^2} R\cos\epsilon_q \quad (24)$$

If arg(v) varies from −π to π, the quantization range is (−π, π], which is evenly divided by the number of quantization levels. For example, in a 2-bit case shown in FIG. 4, there are four quantization levels. Therefore, each quadrant is represented by a particular level. In the case shown in FIG. 4 where Φ lies in the first quadrant (the shaded area), the maximum quantization error is π/4. In general, for quantization using b bits, the quantization error is bounded by $$|\epsilon_q| \le \frac{\pi}{2^b}.$$

Figure 4:
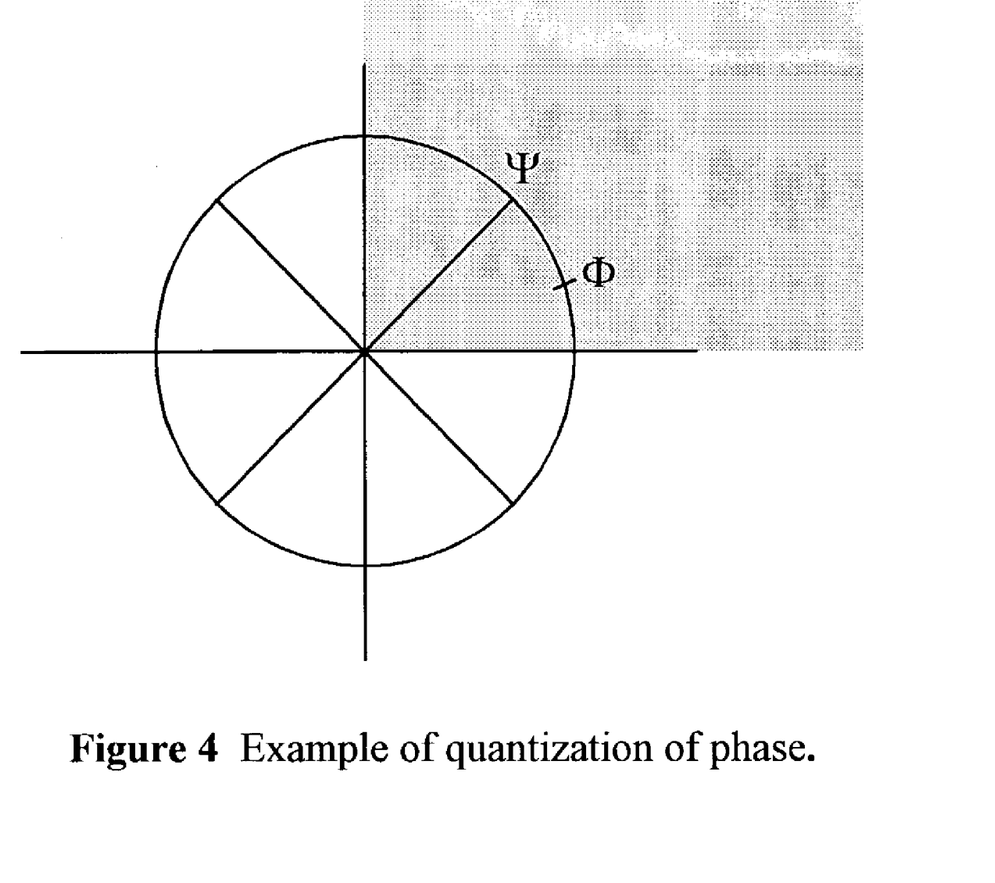
FIG. 4 is diagram illustrating quantization of phase for side information.

If the quantization error ($|\epsilon_q|$) is uniformly distributed over the range $$\left[0, \frac{\pi}{2^b}\right],$$

it causes the gain to degrade by a factor of $$\alpha_r = E[\cos\epsilon_q] = \frac{2^b}{\pi} \sin\frac{\pi}{2^b} \quad (25)$$

where E represents an expected value.

Consider finally the case of side information received at the transmitter where such information is delayed and corrupted with noise. In many cases, the side information will be outdated and corrupted with noise. The delay is caused due to the feedback latency in a frequency division duplex (FDD) system (FIG. 1A) or a time differences in a TDD system (FIG. 1B). Noise results from, e.g., the process of channel estimation.

A common method for facilitating channel estimation is through the use of pilots or training symbols. When received, the pilots will be corrupted by channel and receiver noise along with signals that carried information. Assuming that an optimal estimator is used, one can obtain the estimate of the channel coefficients $h_{kl}$ as $$\tilde{h}_{kl} = h_{kl} + n_{kl} \quad (26)$$

where $n_{kl}$ is a complex Gaussian process representing the noise. Based on the latest channel coefficient estimates, the estimate of the side information is computed at the receiver as $$\tilde{\Phi}_n = \arg\left(\sum_{l=1}^{L} \tilde{h}_{1l} \tilde{h}_{2l}^*\right) = \arg(Re^{j\Phi_n} + \mathcal{N}) = \Phi_n + \Delta_n \quad (27)$$

Having obtained $\tilde{\Phi}_n$, the receiver will need to update or predict the side information for next transmission, $\hat{\Phi}_{n+1}$, based on some particular channel properties. For example, the coefficient of a mobile channel can be modeled as a stationary Gaussian process with an autocorrelation function proportional to the zero-order Bessel function of the first kind with parameters of Doppler frequency. In addition, the constant component of a Ricean propagation channel can also be taken advantage of. In general, one may view the approximation of $\Phi_{n+1}$ as an optimal filter problem; that is, $\Phi_{n+1}$ can be approximated by a linear function of its past samples, $$\hat{\Phi}_{n+1} = f(\tilde{\Phi}_n, \tilde{\Phi}_{n-1}, \ldots, \tilde{\Phi}_{n-q+1}) = \Phi_{n+1} + \varepsilon_n \quad (28)$$

where q denotes the correlation length. For a large value of q, $\epsilon_n$ follows the Gaussian distribution by virtue of the central limit theorem. After $\hat{\Phi}_{n+1}$ is obtained, it will be sent back to the transmitter for the next transmission. Thus, the extra gain that can be realized at the receiver is $$G_x = \frac{(1-\lambda)^{1/2}}{\sigma_h^2} R\cos[\Phi_{n+1} - \hat{\Phi}_{n+1}] \quad (29)$$
$$= \frac{(1-\lambda)^{1/2}}{\sigma_h^2} R\cos\varepsilon_n$$

where $\lambda$ will be set in accordance with the statistical properties of $\epsilon_n$, among which the correlation coefficient $$\rho = \frac{E[\Phi_{n+1}\hat{\Phi}_{n+1}]}{\sqrt{E[\Phi_{n+1}^2]E[\hat{\Phi}_{n+1}^2]}} \quad (30)$$

and the variance of $\epsilon_n$ can be exploited. Two examples are provided below; however, other variants can be used.

From a statistical point of view, $\rho$ indicates the proportion of $\Phi_{n+1}$ that can be attributed to the linear relationship with $\hat{\Phi}_{n+1}$. It can be said that $\rho$ is a quality indicator of the side information: a relatively large value implying high quality side information and a relatively small value implying low quality side information. When the quality is high, the transmitter should emphasize use of the side information, and deemphasize it when its quality is low.

The first two cases above can be considered as the special ones; that is, perfect side information is available when $\rho=1$ whereas side information is not available when $\rho=0$. Therefore, the distribution coefficient $\lambda$ for energy allocation can be set proportional to $\rho$. In particular, $1-\lambda=\rho$. It follows that $$G_x = \frac{\sqrt{\rho}}{\sigma_h^2} R\cos(\varepsilon_n) \quad (31)$$

As mentioned above, the distribution of the error $\epsilon_n$ follows the Gaussian distribution; that is, $$p(\varepsilon_n) = \frac{1}{2\sqrt{\pi}} e^{-\frac{\varepsilon_n^2}{2\sigma_\varepsilon^2}} \quad (32)$$

where $\sigma_\varepsilon^2$ denotes the variance of $\epsilon_n$. Noticing that if $|\epsilon_n|>\pi/2$, $G_x$ will be negative, one may set the distribution coefficient A based on the probability $P(|\epsilon_n|>\pi/2)$. In particular, the percentage of energy allocated for beamforming is set equal to the probability $P(|\epsilon_n|\leq \pi/2)$; that is, $$(1-\lambda)^{1/2} = P\left(|\varepsilon_n| \leq \frac{\pi}{2}\right) \quad (33)$$
$$= 1 - \mathrm{erfc}\left(\frac{\pi}{2\sqrt{2}\sigma_\varepsilon}\right)$$

where erfc denotes the complementary error function. It follows that $$G_x = \left[1 - \mathrm{erfc}\left(\frac{\pi}{2\sqrt{2}\sigma_\varepsilon}\right)\right] \frac{R}{\sigma_h^2} \cos(\varepsilon_n) \quad (34)$$

In practice, one may simplify $$\mathrm{erfc}\left(\frac{\pi}{2\sqrt{2}\sigma_\varepsilon}\right), \text{ if } \frac{\pi}{2\sqrt{2}\sigma_\varepsilon} \gg 1, \text{ as}$$

$$\mathrm{erfc}\left(\frac{\pi}{2\sqrt{2}\sigma_\varepsilon}\right) \approx \frac{2\sqrt{2}\sigma_\varepsilon}{\pi\sqrt{\pi}} e^{-\left(\frac{\pi}{2\sqrt{2}\sigma_\varepsilon}\right)^2} \quad (35)$$

The receiver may use an adaptive filter to predict $\hat{\Phi}_{n+1}$. The type of filter to be used depends on specific applications. For example, one may use a simple averaging filter for a system operating in a Ricean environment. One may use a more sophisticated predictive filter to track $\hat{\Phi}_{n+1}$ such as a Kalman filter if the particular application calls for that.

Initially, there is no side information available to the transmitter and hence $\lambda$ is set to one. When the transmitter starts to receive feedback values of $\hat{\Phi}_{n+1}$, it will begin to evaluate the estimate of $\rho$ as $$\tilde{\rho} \approx \frac{\sum_{n=1}^{N} \hat{\Phi}_{n+1}\hat{\Phi}_n}{\sum_{n=1}^{N} \hat{\Phi}_n^2} \quad (36)$$

where N denotes the number of samples used for the estimation. As N increases, the estimate will become more accurate, and thus an estimate is derived from historical information. Similarly, the estimate of $\sigma_\varepsilon$ can be determined by $$\tilde{\sigma}_\varepsilon^2 \approx \frac{1}{N-1} \sum_{n=1}^{N} (\hat{\Phi}_{n+1} - \hat{\Phi}_n)^2 \quad (37)$$

Although the above method is presented in the context of space and time, it can also be applied to systems that use space and other resources, such as frequency and code. For example, in an orthogonal frequency division multiplex (OFDM) system, one may pair up the subcarriers within an OFDM symbol for transmission. In particular, at $f_1$, $s_{11}$ and $s_{12}$ will be transmitted via the two antennas and at $f_2$, $s_{21}$ and $s_{22}$ will be transmitted via the same two antennas. The time index in the derivation in the paper can be replace by the frequency index. That is, time and frequency (or code) are equivalent in terms of applying this method. Whether this method is implemented in space-time, space-frequency, or space-code, the requirement for the channel is that it stays relatively unchanged during two transmission times or within spacing of the paired subcarriers.

The average SNR can be obtained by evaluating the following expectation; that is, $\bar{\gamma}=E[\gamma]=\gamma_0 E\{G_{AST}\}=\gamma_0 \bar{G}_{AST}$, where $$\bar{G}_{AST} = L + \frac{(1-\lambda)^{1/2}}{\sigma_h^2} E\left[\left|\sum_{l=1}^{L} h_{1l} h_{2l}^*\right|\right] E[\cos\varepsilon] \quad (38)$$

That is, the average SNR depends on the channel condition. In the case of independent Rayleigh fading and L=1, the gain in the average SNR can be expressed as $$\bar{G}_{AST} = 1 + \frac{\pi}{4}(1-\lambda)^{1/2} E[\cos\varepsilon] \quad (39)$$

by using the fact that $$E[|h_{1l} h_{2l}^*|] = \frac{\pi}{4}\sigma_h^2.$$

With $\lambda=0$ and $\epsilon=0$, the gain in the average SNR is 2.51 dB, which is supposed to be in the case of EGC.

For $L \geq 2$, if $\left|\sum_{l=1}^{L} h_{1l} h_{2l}^*\right| = \sum_{l=1}^{L} |h_{1l}|^2$ (e.g., H consists of two fully correlated row vectors), the maximum gain in the average SNR can be obtained as $$\bar{G}_{AST} = \{1 + (1-\lambda)^{1/2} E[\cos\varepsilon]\} L$$

On the other hand, if $$E\left[\left|\sum_{l=1}^{L} h_{1l} h_{2l}^*\right|\right] = 0$$

(e.g., H consists of two mutually orthogonal row vectors), the minimum gain in the average SNR results as $$\bar{G}_{AST} = L \quad (41)$$

Therefore, the average SNR is bounded by, $$L\gamma_0 \leq \bar{\gamma} \leq \{1+(1-\lambda)^{1/2} E[\cos\varepsilon]\} L\gamma_0 \quad (42)$$

A system with binary phase-shift keying (BPSK) modulation is taken as an example to illustrate the error probability P for such a system on the Rayleigh fading channel. The error probability P can be computed by integrating the product of the probability of error conditioned on the channel coefficients, $P(\gamma_b)$, and the probability density function (pdf) of the channel coefficients, $p(\gamma_b)$; that is, $$P = \int_0^{\infty} P(\gamma_b) p(\gamma_b) d\gamma_b \quad (43)$$

where $\gamma_b$ denotes the instantaneous SNR per bit, which is given for BPSK by expanding (18), $$\gamma_b = \gamma_0 \left[\frac{1}{2\sigma_h^2} \sum_{l=1}^{L} (|h_{1l}|^2 + |h_{2l}|^2) + \frac{(1-\lambda)^{1/2}}{\sigma_h^2} \left|\sum_{l=1}^{L} h_{1l} h_{2l}^*\right| \cos\varepsilon \right] \quad (44)$$

Finding the exact distribution of $\gamma_b$ is a problem of finding the distribution of the square of a sum of 2L Rayleigh variables and there is apparently no known closed-form solution. However, in the case of L=1, from (22), the instantaneous SNR is identical to that in the EGC case. Therefore, the error probability for EGC is also applicable here, the closed-form of which is given by, $$P = \frac{1}{2}\left(1 - \sqrt{1 - \left(\frac{1}{\gamma_0+1}\right)^2}\right) \quad (45)$$

If $\gamma_0 \gg 1$, it can be approximated as $$P \approx \frac{1}{4}\gamma_0^{-2} \quad (46)$$

If one is to compute the probability of error by using (43) and (44), but ignoring the second term on the right hand side in (44), the outcome for $\gamma_0 \gg 1$ will show the same formula as for the STBC and MRC; that is $$P \approx 3(4\bar{\gamma})^{-2} \quad (47)$$

where $$\bar{\gamma} = \frac{1}{2}\left(1 + (1-\lambda)^{1/2} \frac{\pi}{4} E[\cos\varepsilon]\right)\gamma_0$$

in this case (whereas for STBC $\bar{\gamma}=\gamma_0/2$ and for MRC, $\bar{\gamma}=\gamma_0$). With $\lambda=0$ and $\epsilon=0$, (47) becomes $P=0.24\gamma_0^{-2}$, showing that (47) is a very close estimate of (46). It is clear that the second term on the right hand side in (44) has little effect on the derivation of error probability. The main contribution to the error probability by this term is through the average SNR, $\bar{\gamma}$.

For $L \geq 2$, one may establish from (44) that $$\gamma_b \geq \frac{\gamma_0}{2\sigma_h^2} \sum_{l=1}^{L} (|h_{1l}|^2 + |h_{2l}^*|^2) \quad (48)$$

The worst error probability $P_{max}$ is the one evaluated under the equal condition. By expressing the pdf of $\gamma_b$ with a $\chi^2$-distributed random variable with 4L degrees of freedom and evaluating (43) with the assumption $\gamma_0 \gg 1$, one can obtain $$P_{max} \approx \left(\frac{1}{4\bar{\gamma}}\right)^{2L} \frac{(4L-1)!}{(2L)!(2L-1)!} \quad (49)$$

In the open literature, the total gain from using multiple antennas is categorized into diversity gain and antenna array gain. The former is realized from the redundancy of multiple copies of the transmitted signal and is analogous to channel coding gain. The antenna array gain is realized from the energy which the receive antennas are able to capture, and is equivalent to the gain in average SNR at the receiver. The array gain can be viewed as a measure of efficiency of a transmission scheme.

In the STBC case, the beam patterns of the transmitting antennas are mutually orthogonal in time. Since the transmitter assumes no knowledge about the channel between itself and the receiver, the only way is to blast energy in all directions by using orthogonal beams. There is no array gain from the transmission. When side information is available, the orthogonality in beam patterns is no longer necessary or even desired since higher energy-efficient transmission can be achieved. In our case, energy is radiated relatively directive to the receiver, thereby reducing co-channel interference. The beam patterns are not orthogonal in general; that is, the dot product.

$$\begin{bmatrix} s_{12} \\ s_{22} \end{bmatrix}^H \begin{bmatrix} s_{11} \\ s_{21} \end{bmatrix} = -2(1-\lambda)c_1c_2 - \lambda(1-\lambda)^{1/2}(v^*c_2c_2 - vc_1c_1) \quad (50)$$

does not vanish except for $\lambda=1$. However, this does not mean that there will mutual interference between the two symbols $c_1$ and $c_2$. Based on (14), it appears that to the receiver, the signal vectors associated with $c_1$ and $c_2$ are mutually orthogonal and hence are completely separable.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

The above detailed descriptions of embodiments of the invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or steps are presented in a given order, alternative embodiments may perform routines having steps in a different order, and some steps may be deleted, moved, added, subdivided, combined, and/or modified. Each of these steps may be implemented in a variety of different ways. Also, while these steps are shown as being performed in series, these steps may instead be performed in parallel, or may be performed at different times.

The teachings of the invention provided herein can be applied to other systems, not necessarily the system described herein. Aspects of the invention described herein may be stored or distributed on computer or machine-readable media, including magnetic and optically readable and removable computer disks, hard-wired or preprogrammed in chips (e.g., EEPROM or other semiconductor chips), as well as distributed electronically over the Internet or over other networks (including wireless networks). These and other changes can be made to the invention in light of the detailed description. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions and concepts of the various references described above to provide yet further embodiments of the invention.

These and other changes can be made to the invention in light of the above detailed description. While the above description details certain embodiments of the invention and describes the best mode contemplated, no matter how detailed the above appears in text, the invention can be practiced in many ways. Details of the communication scheme may vary considerably in its implementation details, while still be encompassed by the invention disclosed herein. As noted above, particular terminology used when describing certain features or aspects of the invention should not be taken to imply that the terminology is being re-defined herein to be restricted to any specific characteristics, features or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

I claim:

1. A communication system, comprising:
a space-time transmitter having multiple transmitting antennas and a space-time encoder, wherein each of the transmitting antennas transmits signals over at least one wireless channel, wherein the transmitted signals represent space-time encoded information symbols;
a space-time receiver having multiple receiving antennas configured to receive the transmitted signals over the wireless channel, wherein a received signal from each receiving antenna is processed by the space-time receiver to extract the information symbols that have been transmitted;
wherein the space-time receiver is configured to determine at least information related to channel coefficients corresponding to a quality of the wireless channel and to provide, over a feedback channel to the space-time transmitter, a channel information signal representing the channel coefficient information;
wherein the space-time encoder is configured to adaptively construct a space-time signal set for transmission based on the information symbols delivered to each transmitting antenna and based on an availability and quality of the channel coefficient information received from the space-time receiver over the feedback channel to enhance a signal to noise ratio obtained at the space-time receiver; and wherein the transmitted signals have a form of:

$$s = \begin{bmatrix} s_{11} & s_{12} \\ s_{21} & s_{22} \end{bmatrix}$$

where entry $S_{km}$ denotes the signal to be transmitted via one of first and second transmit antennas k at one of first and second adjacent time instances, and wherein at the first time instant, signals $s_{11}$ and $s_{21}$ are simultaneously transmitted via respective first and second antennas, wherein $$s_{11} = \frac{c_1}{\sqrt{2}}$$

and $$s_{21} = \frac{1}{\sqrt{2}}[v(1-\lambda)^{1/2}c_1 + \lambda^{1/2}c_2]$$

wherein $c_1$ and $c_2$ represent first and second input symbols, wherein v is a weighting coefficient based on a phase value of the channel coefficient information received from the receiver, and $|v|^2=1$, wherein $\lambda$ is a distribution coefficient, and wherein the distribution coefficient $\lambda$ is less than or equal to 1 and allocates energy between symbols $c_1$ and $c_2$ to be transmitted in accordance with a quality of the received channel coefficient information:
and wherein at the second time instance, signals $s_{12}$ and $s_{22}$ are simultaneously transmitted via the respective first and second antennas, wherein, $$s_{12} = -\frac{c_2^*}{\sqrt{2}}$$

and $$s_{22} = \frac{1}{\sqrt{2}}[-v(1-\lambda)^{1/2}c_2^* + \lambda^{1/2}c_1^*]$$

wherein * represents a complex conjugate of a value, and the weighting coefficient v in $s_{21}$ and $s_{22}$ is applied so that the paired transmitted signals ($s_{11}$ and $s_{21}$, or $s_{12}$ and $s_{22}$) are aligned in phase for the space-time receiver.

2. The communication system of claim 1 wherein an added gain $G_x$ of the transmitted signals received by the space-time receiver, as provided by the received channel coefficient information, is:

$$G_x = \frac{(1-\lambda)^{1/2}}{\sigma_h^2} R\cos[\Phi - \arg(v)]$$

$$= \frac{(1-\lambda)^{1/2}}{\sigma_h^2} R\cos\varepsilon$$

wherein $\varepsilon$ represents a discrepancy between a current channel state $\Phi$ and received side information $\arg(v)$, where $\arg(v)$ is a phase of the side information, $\lambda$ is a distribution coefficient, R is a magnitude of wireless channel coefficients, and $\sigma_h^2$ is an average power of the wireless channel.

3. A communication method, comprising:
receiving side information from a receiver;
encoding information signals for wireless transmission based on the received side information, wherein the encoding is based on space diversity and at least one other diversity, wherein the one other diversity is time diversity, frequency diversity or coding diversity; and
wherein the encoded information signals have a form of:

$$s = \begin{bmatrix} s_{11} & s_{12} \\ s_{21} & s_{22} \end{bmatrix}$$

wherein entry $S_{km}$ denotes the signal to be transmitted via one of two transmit antennas k at one of two time values m, and the encoded information signals represent a weighted combination of one of two input symbols, $c_1$ and $c_2$.

4. The communication method of claim 3, further comprising:
receiving the side information via a time division duplex (TDD) communication system.

5. The communication method of claim 3, further comprising:
receiving the side information via a frequency division duplex (FDD) communication system.

6. The communication method of claim 3, further comprising:
receiving the side information via a communication system having a wired or wireless feedback link from the receiver to the space-time transmitter.

7. The communication method of claim 3 wherein the encoding is based on space and time diversity.

8. The communication method of claim 3 wherein the encoding is based on space and frequency diversity.

9. The communication method of claim 3 wherein the encoding is based on space and coding diversity.

10. The communication method of claim 3 wherein the receiver has multiple receive antennas, and wherein the side information is a single scalar value regardless of a number of the receive antennas.

11. The communication method of claim 3, further comprising:
determining an availability and quality of the received side information; and
adaptively encoding the information signals based on the determined availability and quality of the received side information.

12. The communication method of claim 3 wherein the encoded information signals have a form of:

$$s = \begin{bmatrix} s_{11} & s_{12} \\ s_{21} & s_{22} \end{bmatrix}$$

where entry $s_{km}$ denotes the signal to be transmitted via one of first and second transmit antennas k at one of first and second adjacent time instances, and wherein at the first time instant, signals $s_{11}$ and $s_{21}$ are simultaneously transmitted via respective first and second antennas, wherein $$s_{11} = \frac{c_1}{\sqrt{2}}$$

and $$s_{21} = \frac{1}{\sqrt{2}}[v(1-\lambda)^{1/2}c_1 + \lambda^{1/2}c_2]$$

wherein $c_1$ and $c_2$ represent first and second input symbols, v is a weighting coefficient based on the side information received from the receiver, and $\lambda$ is a distribution coefficient, and wherein the distribution coefficient $\lambda$ allocates energy between symbols $c_1$ and $c_2$ to be transmitted, in accordance with a quality of the received side information;

and wherein at the second time instance, signals $s_{12}$ and $s_{22}$ are simultaneously transmitted via the respective first and second antennas, wherein, $$s_{12} = -\frac{c_2^*}{\sqrt{2}}$$

and $$s_{22} = \frac{1}{\sqrt{2}}[-v(1-\lambda)^{1/2}c_2^* + \lambda^{1/2}c_1^*]$$

wherein * represents a complex conjugate of a value, and the weighting coefficient v in $s_{21}$ and $s_{22}$ is applied so that the paired transmitted signals ($s_{11}$ and $s_{21}$, or $s_{12}$ and $s_{22}$) are aligned in phase for the receiver.

13. The communication method of claim 3 wherein $|v|^2=1$.

14. The communication method of claim 3 wherein an added gain $G_x$ of the encoded information signals received by the receiver, as provided by the received side information, is:

$$G_x = \frac{(1-\lambda)^{1/2}}{\sigma_h^2} R\cos[\Phi - \arg(v)]$$

$$= \frac{(1-\lambda)^{1/2}}{\sigma_h^2} R\cos\varepsilon$$

wherein $\varepsilon$ represents a discrepancy between a current channel state $\Phi$ and received side information $\arg(v)$, $\arg(v)$ is a phase of the side information, $\lambda$ is a distribution coefficient, and $\sigma_h^2$ is an average power of the channel.

15. The communication method of claim 3, further comprising:

at the receiver, determining an approximation of a next channel state $\hat{\Phi}_{n+1}$ from a true next channel state $\Phi_{n+1}$ under a linear function of past channel state samples as:

$$\hat{\Phi}_{n+1} = f(\tilde{\Phi}_n, \tilde{\Phi}_{n-1}, \ldots \tilde{\Phi}_{n-q+1}) = \Phi_{n+1} + \epsilon_n$$

wherein q is a correlation length, $\epsilon_n$ is an error that follows a Gaussian distribution, and $$\rho = \frac{E[\Phi_{n+1}\hat{\Phi}_{n+1}]}{\sqrt{E[\Phi_{n+1}^2]E[\hat{\Phi}_{n+1}^2]}}$$

wherein $\rho$ indicates a proportion of $\hat{\Phi}_{n+1}$ that can be attributed to a linear relationship with $\Phi_{n+1}$.

16. The communication method of claim 3, further comprising:

at the receiver, determining an approximation of a next channel state $\Phi_{n+1}$ under a linear function of past channel state samples.

17. A machine-readable medium whose contents cause at least one transmitter system to perform a communication method, the communication method comprising:

at a wireless transmitter, receiving side information from a wireless receiver regarding a wireless channel;

encoding information symbols for transmission based on the determined side information, where the encoding includes adaptively allocating energy between symbols to be transmitted in accordance with a quality of the received side information, and wherein encoding the information symbols for transmission includes encoding the information symbols for space diversity and at least one other diversity, wherein the one other diversity is time diversity, frequency diversity or coding diversity; and wherein an added gain $G_{AST}$ of the encoded information signals received by the receiver is:

$$G_{AST} = \frac{1}{2\sigma_h^2}\sum_{l=1}^{L}(|h_{1l}^2| + |h_{2l}^2|) + \frac{(1-\lambda)^{1/2}}{\sigma_h^2}\text{Re}\left(v^*\sum_{l=1}^{L}h_{1l}h_{2l}^*\right)$$

wherein $h_{k,l}$ represent conditions of the wireless channel, v is a weighting coefficient based on the side information, $\lambda$ is a distribution coefficient, and $\sigma_h^2$ is an average power of the wireless channel.

18. The machine-readable medium of claim 17 wherein encoding the information signals includes constructing at least:

$$s = \begin{bmatrix} s_{11} & s_{12} \\ s_{21} & s_{22} \end{bmatrix}$$

wherein entry $s_{km}$ denotes a signal to be transmitted via at least one of two transmit antennas k with respect to at least one of two time or frequency values m, and represent a weighted combination of at least one of two input symbols, $c_1$ and $c_2$.

19. The machine-readable medium of claim 17, further comprising:

determining an approximation of a next channel state under a linear function of past channel state samples.

20. The machine-readable medium of claim 17 wherein the side information is a single scalar value regardless of a number of receive antennas.

21. The machine-readable medium of claim 17 wherein the machine-readable medium is a logical node in a network receiving the contents.

22. The machine-readable medium of claim 17 wherein the machine-readable medium is a data transmission medium carrying a generated data signal containing the contents.

23. The machine-readable medium of claim 17 wherein the machine-readable medium is a memory of a telecommunication system.

24. The machine-readable medium of claim 17 wherein the machine-readable medium is a semiconductor memory.

25. The machine-readable medium of claim 17 wherein the machine-readable medium is a machine-readable disk.

26. A communication system, comprising:

a space-time transmitter having multiple transmitting antennas and a space-time encoder, wherein each of the transmitting antennas transmits signals over at least one wireless channel, wherein the transmitted signals represent space-time encoded information symbols;

a space-time receiver having multiple receiving antennas configured to receive the transmitted signals over the wireless channel, wherein a received signal from each receiving antenna is processed by the space-time receiver to extract the information symbols that have been transmitted;

wherein the space-time receiver is configured to determine at least information related to channel coefficients corresponding to a quality of the wireless channel and to provide, over a feedback channel to the space-time transmitter, a channel information signal representing the channel coefficient information;

wherein the space-time encoder is configured to adaptively construct a space-time signal set for transmission based on the information symbols delivered to each transmitting antenna and based on an availability and quality of the channel coefficient information received from the space-time receiver over the feedback channel to enhance a signal to noise ratio obtained at the space-time receiver; and wherein an added gain $G_x$ of the transmitted signals received by the space-time receiver, as provided by the received channel coefficient information, is:

$$s = \begin{bmatrix} s_{11} & s_{12} \\ s_{21} & s_{22} \end{bmatrix}$$

wherein $\epsilon$ represents a discrepancy between a current channel state $\Phi$ and received side information $\arg(v)$, where $\arg(v)$ is a phase of the side information, $\lambda$ is a distribution coefficient, R is a magnitude of wireless channel coefficients, and $\sigma_h^2$ is an average power of the wireless channel.

27. The communication system of claim 26 wherein the transmitted signals have a form of:

$$s = \begin{bmatrix} s_{11} & s_{12} \\ s_{21} & s_{22} \end{bmatrix}$$

where entry $s_{km}$ denotes the signal to be transmitted via one of first and second transmit antennas k at one of first and second adjacent time instances, and wherein at the first time instant, signals $s_{11}$ and $S_{21}$ are simultaneously transmitted via respective first and second antennas, wherein $$s_{11} = \frac{c_1}{\sqrt{2}}$$

and $$s_{21} = \frac{1}{\sqrt{2}}[v(1-\lambda)^{1/2}c_1 + \lambda^{1/2}c_2]$$

wherein $c_1$ and $c_2$ represent first and second input symbols, wherein v is a weighting coefficient based on a phase value of the channel coefficient information received from the receiver, and $|v|^2=1$, wherein $\lambda$ is a distribution coefficient, and wherein the distribution coefficient $\lambda$ is less than or equal to 1 and allocates energy between symbols $c_1$ and $c_2$ to be transmitted in accordance with a quality of the received channel coefficient information;

and wherein at the second time instance, signals $S_{12}$ and $S_{22}$ are simultaneously transmitted via the respective first and second antennas, wherein, $$s_{12} = -\frac{c_2^*}{\sqrt{2}}$$

and $$s_{22} = \frac{1}{\sqrt{2}}[-v(1-\lambda)^{1/2}c_2^* + \lambda^{1/2}c_1^*]$$

wherein * represents a complex conjugate of a value, and the weighting coefficient v in $S_{21}$ and $S_{22}$ is applied so that the paired transmitted signals ($s_{11}$ and $S_{21}$, or $s_{12}$ and $s_{22}$) are aligned in phase for the space-time receiver.

28. A communication method, comprising: receiving side information from a receiver, encoding information signals for wireless transmission based on the received side information, wherein the encoding is based on space diversity and at least one other diversity, wherein the one other diversity is time diversity, frequency diversity or coding diversity, and wherein $|v|^2=1$, and wherein the encoded information signals have a form of:

$$s = \begin{bmatrix} s_{11} & s_{12} \\ s_{21} & s_{22} \end{bmatrix}$$

where entry $s_{km}$ denotes the signal to be transmitted via one of first and second transmit antennas k at one of first and second adjacent time instances, and wherein at the first time instant, signals $s_{11}$ and $s_{21}$ are simultaneously transmitted via respective first and second antennas, wherein $$s_{11} = \frac{c_1}{\sqrt{2}}$$

and $$s_{21} = \frac{1}{\sqrt{2}}[v(1-\lambda)^{1/2}c_1 + \lambda^{1/2}c_2]$$

wherein $c_1$ and $c_2$ represent first and second input symbols, v is a weighting coefficient based on the side information received from the receiver, and is a distribution coefficient, and wherein the distribution coefficient allocates energy between symbols $c_1$ and $c_2$ to be transmitted, in accordance with a quality of the received side information, and wherein at the second time instance, signals $s_{12}$ and $s_{22}$ are simultaneously transmitted via the respective first and second antennas, wherein, $$s_{12} = -\frac{c_2^*}{\sqrt{2}}$$

and $$s_{22} = \frac{1}{\sqrt{2}}[-v(1-\lambda)^{1/2}c_2^* + \lambda^{1/2}c_1^*]$$

wherein * represents a complex conjugate of a value, and the weighting coefficient v in $s_{21}$ and $s_{22}$ is applied so that the paired transmitted signals ($s_{11}$ and $s_{21}$, or $s_{12}$ and $s_{22}$) are aligned in phase for the receiver.

29. The communication method of claim 28 wherein the encoding is based on space and time diversity.

30. The communication method of claim 28 wherein the encoding is based on space and frequency diversity.

31. The communication method of claim 28 wherein the encoding is based on space and coding diversity.

32. The communication method of claim 28, further comprising:
    determining an availability and quality of the received side information; and
    adaptively encoding the information signals based on the determined availability and quality of the received side information.

33. The communication method of claim 28 wherein the encoded information signals have a form of:

$$s = \begin{bmatrix} s_{11} & s_{12} \\ s_{21} & s_{22} \end{bmatrix}$$

where entry $S_{km}$ denotes the signal to be transmitted via one of first and second transmit antennas k at one of first and second adjacent time instances, and wherein at the first time instant, signals $s_{11}$ and $S_{21}$ are simultaneously transmitted via respective first and second antennas, wherein $$s_{11} = \frac{c_1}{\sqrt{2}}$$

and $$s_{21} = \frac{1}{\sqrt{2}}[v(1-\lambda)^{1/2}c_1 + \lambda^{1/2}c_2]$$

wherein $c_1$ and $c_2$ represent first and second input symbols, v is a weighting coefficient based on the side information received from the receiver, and $\lambda$ is a distribution coefficient, and wherein the distribution coefficient $\lambda$ allocates energy between symbols $c_1$ and $c_2$ to be transmitted, in accordance with a quality of the received side information;

and wherein at the second time instance, signals $s_{12}$ and $s_{22}$ are simultaneously transmitted via the respective first and second antennas, wherein, $$s_{12} = -\frac{c_2^*}{\sqrt{2}}$$

-continued and $$s_{22} = \frac{1}{\sqrt{2}}[-v(1-\lambda)^{1/2}c_2^* + \lambda^{1/2}c_1^*]$$

wherein * represents a complex conjugate of a value, and the weighting coefficient v in $s_{21}$ and $s_{22}$ is applied so that the paired transmitted signals ($s_{22}$ and $s_{21}$, or $s_{12}$ and $s_{22}$) are aligned in phase for the receiver.

34. The communication method of claim 28, further comprising:
    at the receiver, determining an approximation of a next channel state $\hat{\Phi}_{n+1}$ from a true next channel state $\Phi_{n+1}$ under a linear function of past channel state samples as:

$$\hat{\Phi}_{n+1} = f(\tilde{\Phi}_n, \tilde{\Phi}_{n-1}, \ldots \tilde{\Phi}_{n-q+1}) = \Phi_{n+1} + \epsilon_n$$

wherein q is a correlation length, $\epsilon_n$ is an error that follows a Gaussian distribution, and $$\rho = \frac{E[\Phi_{n+1}\hat{\Phi}_{n+1}]}{\sqrt{E[\Phi_{n+1}^2]E[\hat{\Phi}_{n+1}^2]}}$$

wherein $\rho$ indicates a proportion of $\Phi_{n+1}$ that can be attributed to a linear relationship with $\hat{\Phi}_{n+1}$.

35. The communication method of claim 28, further comprising:
    at the receiver, determining an approximation of a next channel state $\hat{\Phi}_{n+1}$ under a linear function of past channel state samples.

36. A communication method, comprising:
    receiving side information from a receiver;
    encoding information signals for wireless transmission based on the received side information, wherein the encoding is based on space diversity and at least one other diversity, wherein the one other diversity is time diversity, frequency diversity or coding diversity; and
    wherein an added gain $G_x$ of the encoded information signals received by the receiver, as provided by the received side information, is:

$$s = \begin{bmatrix} s_{11} & s_{12} \\ s_{21} & s_{22} \end{bmatrix}$$

wherein $\epsilon$ represents a discrepancy between a current channel state $\Phi$ and received side information arg(v), arg(v) is a phase of the side information, $\lambda$ is a distribution coefficient, and $\sigma_h^2$ is an average power of the channel.

37. The communication method of claim 36, further comprising:
    receiving the side information via a time division duplex (TDD) communication system.

38. The communication method of claim 36, further comprising:
    receiving the side information via a frequency division duplex (FDD) communication system.

39. The communication method of claim 36, further comprising:

receiving the side information via a communication system having a wired or wireless feedback link from the receiver to the space-time transmitter.

40. The communication method of claim 36 wherein the encoding is based on space and time diversity.

41. The communication method of claim 36 wherein the encoding is based on space and frequency diversity.

42. The communication method of claim 36 wherein the encoding is based on space and coding diversity.

43. The communication method of claim 36 wherein the receiver has multiple receive antennas, and wherein the side information is a single scalar value regardless of a number of the receive antennas.

44. The communication method of claim 36, further comprising:

determining an availability and quality of the received side information; and adaptively encoding the information signals based on the determined availability and quality of the received side information.

\* \* \* \* \*